United States Patent [19]

Fujimoto et al.

[11] 4,445,153

[45] Apr. 24, 1984

[54] METHOD OF CORRECTING TRACK MISALIGNMENT OF FLOPPY DISC AND APPARATUS THEREFOR

[75] Inventors: Sakae Fujimoto, Tokyo; Masahiro Hatsuno, Kanagawa, both of Japan

[73] Assignee: Ricoh Company, Ltd., Japan

[21] Appl. No.: 240,412

[22] Filed: Mar. 4, 1981

[30] Foreign Application Priority Data

Mar. 7, 1980 [JP] Japan .................. 55-028865
Nov. 19, 1980 [JP] Japan .................. 55-162814

[51] Int. Cl.³ .................. G11B 5/56; G11B 21/10
[52] U.S. Cl. .................. 360/77; 360/109
[58] Field of Search .................. 360/77, 78, 106, 99, 360/109

[56] References Cited

U.S. PATENT DOCUMENTS

| | | | |
|---|---|---|---|
| 3,126,535 | 3/1964 | Streeter | 360/77 |
| 3,749,827 | 7/1973 | Kinjo et al. | 360/106 |
| 3,770,905 | 11/1973 | Sperry | 360/106 |
| 3,906,326 | 9/1975 | Chur | 360/106 |
| 3,950,783 | 4/1976 | Herring et al. | 360/106 |
| 3,969,768 | 7/1976 | Ebbing | 360/106 |
| 4,030,137 | 6/1977 | Dalziel | 360/106 |
| 4,160,270 | 7/1979 | Goldschmidt | 360/77 |
| 4,204,234 | 5/1980 | Noble | 360/77 |
| 4,263,632 | 4/1981 | Burke et al. | 360/106 |
| 4,305,104 | 12/1981 | Donohue | 360/106 |
| 4,314,291 | 2/1982 | Oda et al. | 360/77 |

FOREIGN PATENT DOCUMENTS

49-20208  5/1974  Japan .................. 360/77

*Primary Examiner*—Stuart N. Hecker
*Attorney, Agent, or Firm*—Guy W. Shoup

[57] ABSTRACT

A read/write head is fed to the location over a desired track by a usual access operation. Subsequently, the head undergoes an incremental movement from a base point where the head has been initially stopped, and in the course of such movement, a read operation is performed at each of any selected positions. An output level form each reading operation is stored in a memory in a patterned form. The stored pattern is then compared against a given reference which is chosen to serve as the criterion, and the head position throughout the incremental movement where the best output is read is detected. The read/write head is again moved to the detected position, followed by a normal read/write operation.

Head feed means is provided on which the read/write head is mounted and which is adapted to permit a usual access operation. The head feed means is itself a substantially integral form and is constructed to be incrementally movable in a direction to traverse the track. An apparatus for correcting a track misalignment of a floppy disc includes a cam which is driven by an intermittent feed mechanism and which has a cam surface disposed in abutment against a member (on which the read/write head is mounted) defining the support for the head feed means. The intermittent feed mechanism is operated each time the plunger associated with a solenoid moves in the vertical direction, thereby rotating the cam to cause an incremental movement of the read/write head in accordance with the displacement of the cam surface.

2 Claims, 28 Drawing Figures

F I G. 1
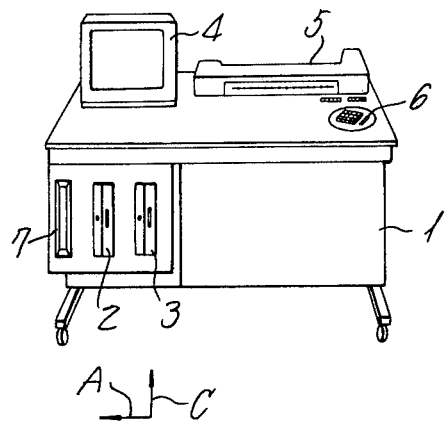
F I G. 2
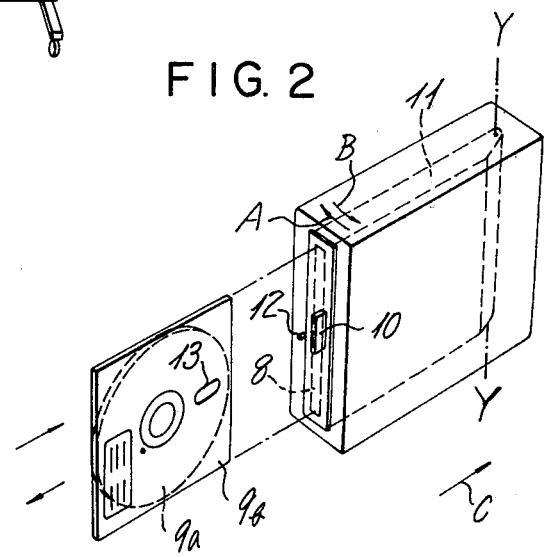
F I G. 3
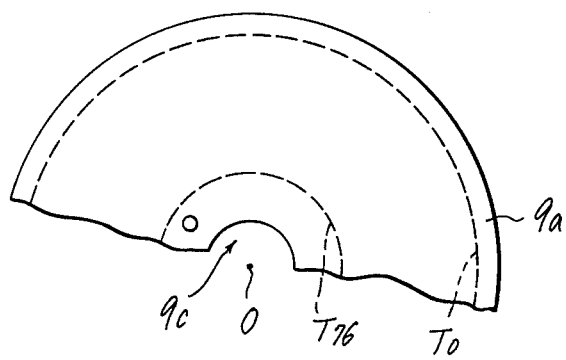

METHOD OF CORRECTING TRACK MISALIGNMENT OF FLOPPY DISC AND APPARATUS THEREFOR

BACKGROUND OF THE INVENTION

A disc-shaped magnetic record medium is known which is commonly referred to as a floppy disc, and a floppy disc drive unit is also known which permits information to be recorded on or retrieved from the floppy disc.

The floppy disc is formed with a plurality of concentric tracks which serve as information record areas. When reading or writing such information, the floppy disc is mounted on the drive unit, and the read/write head is fed through a given distance from a home or reference position on the unit.

A satisfactory recording and playback of information is obviously possible only when the read/write head is located properly relative to a desired track. As is well recognized, a floppy disc comprises a thin disc formed of a synthetic resin, which is susceptible to thermal deformation and deflection. For this reason, there may sometimes be an offset, though small in quantity, between the stop position of the read/write head and the location of a track on which desired information is recorded if the floppy disc is flexed when it is mounted on the drive unit as a result of the thermal deformation or if the access of the read/write head produces a positional error. This results makes it difficult to achieve a satisfactory information recording or playback.

A conventional head feed device is designed to feed the head a given stroke before it is stopped, assuming that a floppy disc is free from any deformation or deflection and is mounted on the unit in an ideal manner. Consequently, if the floppy disc itself has been deformed or flexed to cause a departure, it is evident that an offset is produced between the head and the track. Also the read/write head itself may be stopped at a position which varies from time to time. Thus, there is a need of some means which assures a proper alignment of the read/write head and the track.

SUMMARY OF THE INVENTION

It is an object of the invention to provide a method of achieving a proper alignment with a desired location to be read or written of a read/write head which has once been fed to a location over a desired track.

It is another object of the invention to provide an apparatus for correcting a track misalignment of a floppy disc which may be used in a floppy disc drive unit utilizing a lead screw as head feed means and in which the read/write head is subject to an incremental movement after its initial stop.

It is a further object of the invention to provide an apparatus for correcting a track misalignment of a floppy disc which may be used in a floppy disc drive unit including a read/write head connected to a wire which extends around a pulley serving as head feed means and in which the read/write head is subject to an incremental movement from its initial stop position.

It is still another object of the invention to provide an apparatus for correcting a track misalignment of a floppy disc which utilizes a plate-shaped cam in order to reduce the space requirement.

It is a still further object of the invention to provide an apparatus for correcting a track misalignment of a floppy disc which can be constructed in a simple manner while utilizing a disc-shaped cam.

BRIEF DESCRIPTION OF THE DRAWINGS

FIG. 1 is a perspective view of an office computer in which a floppy disc drive unit is used.

FIG. 2 is a perspective view of the floppy disc drive unit.

FIG. 3 is a fragmentary plan view of a floppy disc.

DESCRIPTION OF EMBODIMENTS

1. Correction of track misalignment

Figure 4:
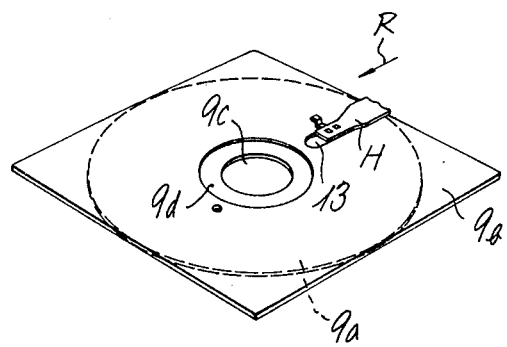
FIG. 4 is a perspective view illustrating the relationship between a floppy disc and a read/write head.

FIG. 1 shows a so-called office computer which may incorporate a floppy disc drive unit, the detail of which is shown in FIG. 2. Before describing the invention in detail, it will be appropriate to summarize the arrangement of a floppy disc drive unit.

Referring to FIG. 1, the office computer includes a framework 1 which is generally in the form of a desk. A variety of members and devices which are required to construct the office computer are mounted on the frame 1, including floppy disc drive units 2, 3, a display 4, a serial printer 5, ten keys 6 which are used for input purpose, and the like. The essential parts of the computer are disposed within the frame, and are therefore externally invisible. A stowage is indicated at 7 for containing a replacement floppy disc.

It will be understood that the office computer is operated by an operator who is seated on a chair facing the framework 1. As shown in FIG. 2, the floppy disc drive unit is generally box-shaped, and has a rectangular slit 8 formed in its front face. A floppy disc 9a is enclosed in a case 9b, and the assembly is pushed into the drive unit through the slit 8 until it is completely received. By moving a finger member 10 in a direction indicated by an arrow A, a lid 11 angularly moves about an axis Y—Y, whereupon support means, not shown, rotatably mounts the floppy disc 9a in a given drive position, permitting a read/write operation.

When removing the floppy disc 9a that has been mounted, a pushbutton 12 which is connected to a latch, not shown, is depressed. While not shown, a spring normally urges the lid 11 to move in a direction indicated by an arrow B about the axis Y—Y, so that when the latch is disengaged, the lid 11 angularly moves in the direction of the arrow B to release the floppy disc 9a from its drive position. Subsequently, the floppy disc 9a may be withdrawn through the slit 8, and replaced by another floppy disc.

Referring to FIG. 3, the floppy disc 9a is disc-shaped and is formed of a flexible or pliable material so as to be rotatable within the case 9b. The floppy disc 9a is formed with a plurality of concentric tracks on which digital information can be magnetically recorded. Reference character $T_{76}$ represents an innermost track while character $T_0$ represents an outermost track. Thus, there are 77 tracks in total which are equally spaced from each other.

The floppy disc 9a is centrally formed with an aperture 9c, the edge of which is engaged, in a sandwich manner, by a holding rotating assembly to rotate the disc, thus feeding the disc circumferentially during an information read operation.

Referring to FIG. 4, the case 9b is centrally formed with an aperture 9d which is greater than and is aligned with the aperture 9c, thus facilitating the engagement of the rotating assembly with the edge of the aperture 9c.

During a read operation, a read/write head H is fed in a radial direction R, as indicated in FIG. 4. The read/write head has the function of reading information from a floppy disc or writing information onto a floppy disc or both.

The case 9b is formed with an elongate slot 13 to permit the read/write head H to contact the surface of the floppy disc 9a. During a read/write operation, the head H moves in the radial direction R, which is transverse to the track, over the surface of the floppy disc 9a which rotates at a constant speed, thus detecting a desired track in order to record information thereon or to read recorded information therefrom.

Figure 5:
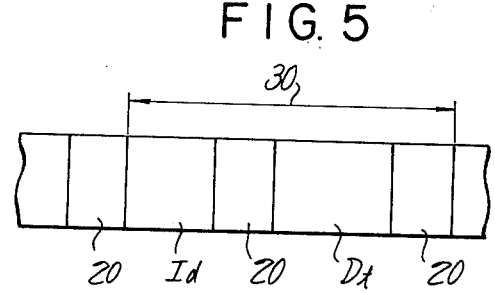
FIG. 5 is an enlarged view illustrating one sector of a given track.

Each of the tracks can be divided into a number of sectors. FIG. 5 shows one of these sectors in enlarged form. Character Id represents an ID field while character Dt represents a data field. A gap 20 in which no record is made is interposed between these fields or regions. As indicated at 30, one sector includes one ID field Id, one data field Dt and a pair of gaps 20. Information which serves information retrieval is previously recorded in the ID field Id, and normally no entry of new information is made with respect to the ID field Id. The erasure or write-in of information is only made with respect to the data field Dt.

As mentioned previously, the fact that a floppy disc is formed of synthetic resin into a thin disc results in the susceptibility of the disc to thermal deformation and deflection. On the other hand, a floppy disc drive unit is generally designed to stop a read/write head at positions which are predetermined in accordance with a pitch between adjacent tracks, assuming that there is no departure in the pitch between the tracks. Hence, if the floppy disc is deformed due to humidity or temperature rise, there occurs an offset between the location of the read/write head and the location of a desired track.

Figure 6:
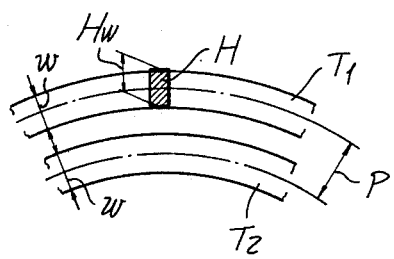
FIGS. 6 to 8 are views illustrating the relationship between the read/write head and the track.
Figure 7:
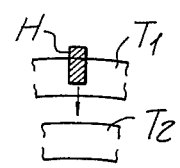
Figure 8:
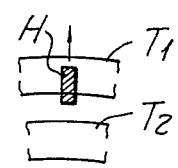

Head feed means which is usually employed to feed the read/write head in the radial direction comprises a feed screw which is threadably engaged by a head body carrying the read/write head so that the read/write head H can be fed in the axial direction of the feed screw as the latter rotates. When this technique is relied upon, the precision of the feed screw directly influences the positional accuracy of the read/write head. A high precision motor such as pulse motor or servo motor is used to drive the feed screw. However, if a pulse motor is used, it is difficult as a matter of practice to stop the read/write head H properly at the location of a desired track because of the precision of the feed screw and the influences of the temperature and humidity to which various members are subject. To illustrate, reference is made to FIGS. 6 to 8 which show arbitrarily chosen tracks $T_1$, $T_2$ having a pitch therebetween of $P=529\mu$, and a track width $W=330\mu$ for cooperation with a read/write head having a width $Hw=330\mu$. In this instance, the accuracy with which the read/write head is stopped involves an unavoidable variation on the order of $\pm 50\mu$ with respect to the correct position. In this manner, a flexure or deformation of a floppy disc when it is mounted on a drive unit, its thermal deformation and/or an error in the position where the head is stopped during the access operation results in an offset being produced between the head and the location of a desired track, causing a reduction in the magnitude of output read therefrom or a failure to write information onto the track at a proper position, thus presenting difficulty in the reproducibility of information.

In accordance with the invention, before information is written into a data field or recorded information is read from a data field, an optimum location of a read/write head is determined by subjecting the read/write head, which has once been moved to the location of a given ID field on a given track in a normal manner, to an incremental movement in a direction transverse to the track, reading information recorded in an ID field or data field in each of selected locations, and storing the quality level of information read in a memory in a manner corresponding to the location of the head. Specific means to cause an incremental movement of the read/write head in a direction transverse to the track will be specifically described later. In one form, the read/write head is mounted on a head body, through which a feed screw extends in threadable engagement. A plate-shaped cam causes the head to be moved to the opposite sides of the centerlines of a desired track in integral manner with the feed screw. Alternatively, the angle of rotation of the feed screw may be controlled by a separate control system.

The ideal centerline of the track represents an imaginary line on a segment of a circle struck from the center 0 (see FIG. 3) and which extends through the center of a given track. This can be expressed as follows:

$$R_n = X + \left[ \frac{76 - n}{48} \right] \times 25.4 \text{ (mm)}$$

where R represents the distance measured from the center 0 to the ideal centerline of the track, n a track number from 0 to 76, X is equal to 51.37 and 49.421 for a first and a second surface (surface A and B), and 25.4 is a constant for changing inch into millimeter, respectively.

In FIGS. 9 to 12, the coil of the read/write head is indicated by numeral 40 while the ideal centerline of the track is indicated by characters T—T. When the read/write head has been fed to a location over a desired track, it is temporarily stopped at this location. Considering this position as an initial position, the read/write head undergoes a continuous or intermittent movement from a base point which is defined by the initial position within a given extent which is chosen to be on the order of a track width, for example, or less. An intermittent movement is understood herein as a repetition of a movement through a given stroke alternating with a given length of stop time. By way of example, when the head undergoes an intermittent movement, it is presumed that the incremental movement of the head may assume three points in total, one each on the opposite sides of the ideal centerline of the track. Specifically, this may be illustrated by the coil 40 of the head which assumes (I) a position nearest the center 0, (II) a position which is located outer than the position (I), and (III) a position further displaced outwardly then the position (II). It may be assumed that the sequence goes through (II)→(I)→(III). Alternatively, the access may proceed in the sequence of (III)→(I)→(II) or (I)→(II)→(III) or (I)→(III)→(II). In addition, a sequence of access may be considered which is completed within a minimum length of time.

Figure 9:
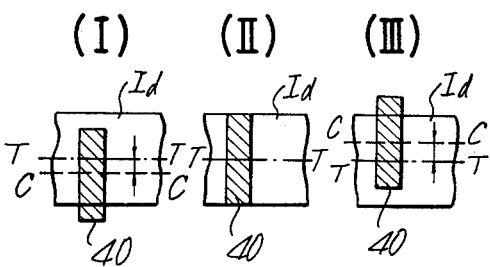
FIGS. 9 to 12 are schematic views illustrating a coil position over ID field.

Assuming that the floppy disc exhibits no deformation and the read/write head is positioned in a manner such that its centerline C—C coincides with the ideal centerline T—T of the track as indicated in FIG. 9 (II), the quality level of information read out from the track will be a satisfactory one. The quality level may represent the current level read from the magnetic head or a binary determination that the information can be or cannot be read. As compared with the case (II), the centerline C—C of the head is offset from the ideal centerline T—T of the track in each of cases (I) and (III), and hence the quality level of information read out from the track will be degraded. This is listed in the table below.

TABLE 1

| Head Position | (I) | (II) | (III) |
|---|---|---|---|
| Quality Level | X | O | X |

In this instance, a position where a satisfactory reading can occur is indicated by 0 while those positions which fail to provide a satisfactory reading are indicated by X. Hence, in the present example, it is appropriate that the read/write head be finally located at the position corresponding to the case (II).

Figure 10:
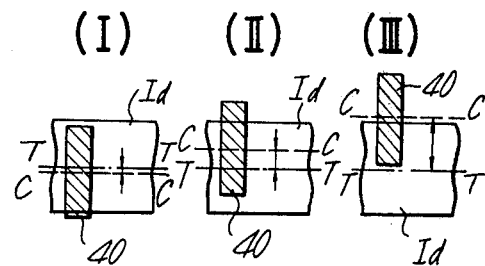
Figure 11:
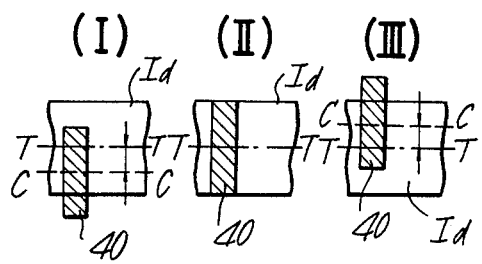
Figure 12:
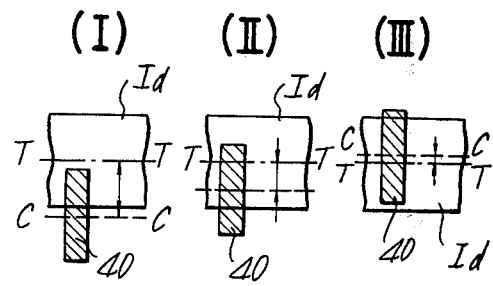

In a similar manner, various cases shown in FIGS. 10 to 12 are listed in the table below.

TABLE 2

| Case | Head position | | | FIG. | Optimum head position |
|---|---|---|---|---|---|
|  | I | II | III |  |  |
| 1 | O | X | X | 10 | I |
| 2 | O | O | X |  |  |
| 3 | X | O | X | 11 | II |
| 4 | O | O | O |  |  |
| 5 | X | X | O | 12 | III |
| 6 | X | O | O |  |  |
| 7 | O | X | O |  |  |
| 8 | X | X | X |  |  |

Referring to Table 2, it will be seen that cases 1 and 2 may be considered for the arrangement of FIG. 10. There is no problem whatsoever for the case 1, but in case 2, a satisfactory reading is assured in each of positions (I) and (II), so that it will be appropriate to choose either position (I) or (II) for the actual operation. In the above table, the position (I) is chosen as the optimum position since the position (I) is nearer the ideal centerline of the track in consideration of the tendency indicated in FIG. 10. The same applies to cases 4 and 6. Case 7 cannot occur theoretically while case 8 occurs, for example, when the read/write head is substantially displaced for some reason or a faulty floppy disc is mounted and in which the present invention cannot be carried out. In these instances, an abnormality signal is produced to indicate the fault of the floppy disc drive unit.

In the above description, the quality level of information read out is represented in binary fashion by 0 and X marks. However, the magnitude of the output from the positions (I), (II) and (III) may be compared against each other to determine the maximum output in order to determine the optimum head position. Additionally, in each case, more than three positions as indicated by positions (I), (II) and (III) may be used. Furthermore, instead of a stepwise movement it is possible to utilize a linear movement as well as an analog read-out during such movement. For example, an output read out may be plotted on the ordinate against the position on the abscissa where the output is read.

It is desirable that the correction of a track misalignment through the incremental movement of the read/write head be automatically performed (1) when the floppy disc drive unit is turned on, (2) when a floppy disc is changed and (3) when a satisfactory reading of information recorded on the data field failed to occur. The correction for the instance (3) assures against the possibility that even after the correction has once been performed with respect to an arbitrary track, the failure of a satisfactory reading may occur when the head moves to another sector or another track.

Figure 13:
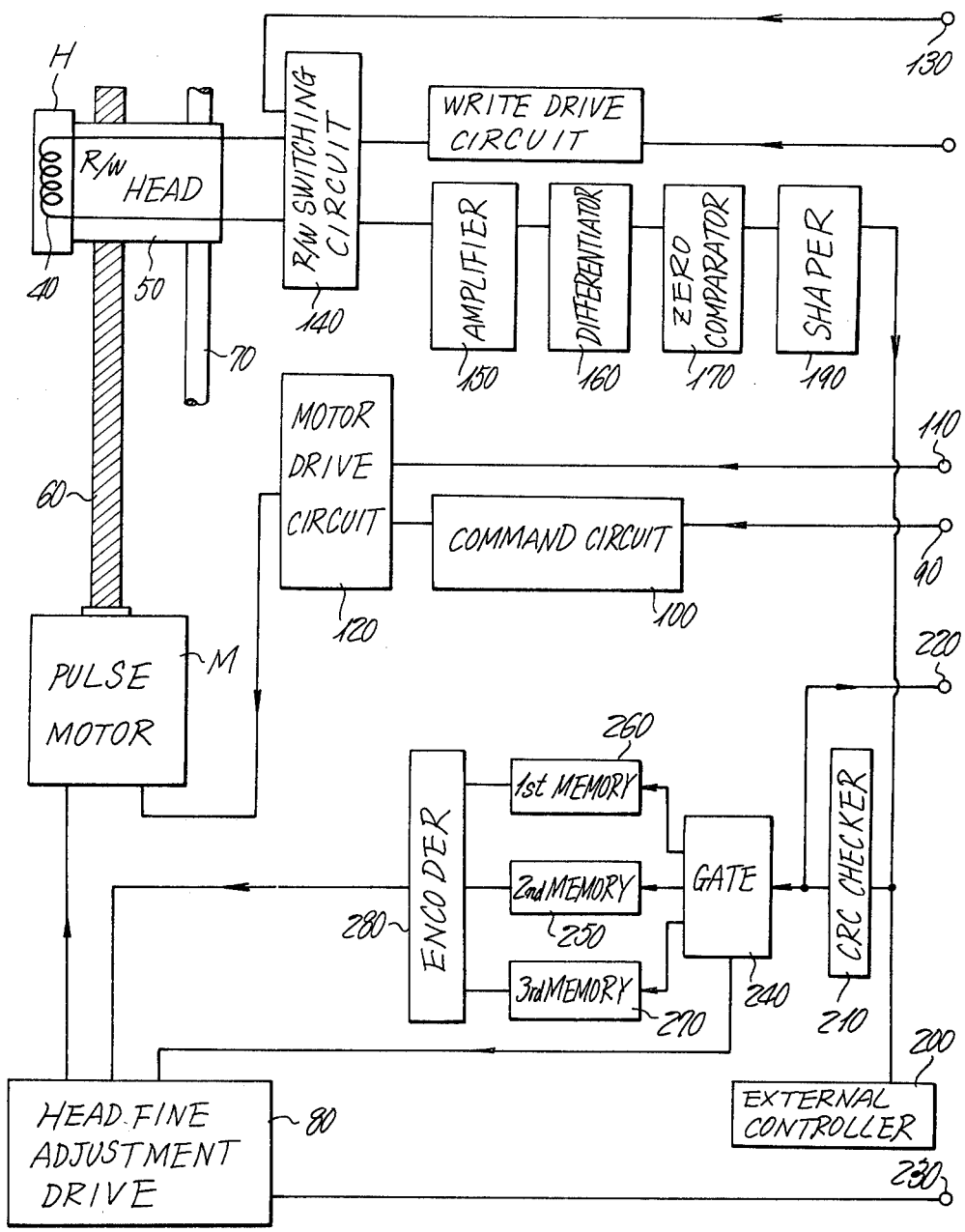
FIG. 13 is a block diagram of a system for automatically correcting a track misalignment which is suitable for use in carrying out the present invention.

Referring to FIG. 13, an automatic correction of a track misalignment will now be described. In FIG. 13, a read/write head H is mounted on a head body 50, which is threadably engaged by a feed screw 60 coupled to a pulse motor M, the screw 60 extending through the head body 50. As the feed screw 60 rotates, the head is accessed in a direction to traverse tracks of a floppy disc. To prevent the head body from rotating, an anti-rotation and guide shaft 70 extends therethrough. The pulse motor M may be replaced by a servo motor. The pulse motor M, read/write head 50 and feed screw 60 constitute together means to drive the head for a fine adjustment. An incremental movement of the read/write head 50 is achieved by a head fine adjustment drive 80, which may comprise a mechanism for causing a stepwise incremental movement of the read/write head H together with the feed screw 60 (as will be described later) or a drive pulse output circuit which causes an incremental rotation of the pulse motor M.

In a normal reading operation, a signal indicative of the direction in which a desired track is located is applied to a terminal 90 and thence to a command circuit 100 which indicates the direction of rotation of the motor while a pulse signal indicative of a desired track is applied to a terminal 110 and thence to a motor drive circuit 120. As a result, the pulse motor M is driven to access the read/write head 50 to a location over a desired track on the floppy disc. Simultaneously, a read/write signal is applied to a terminal 130 and thence to a read/write switching circuit 140, whereby the head H is switched to read data from the disc. Data pulse signal which has been read out by the head H from the floppy disc is fed through a usual loop circuit provided in a floppy disc drive unit, including the read/write switching circuit 140, amplifier 150, differentiator 160, zero comparator 170 and shaper 190, and is output to an external controller 200. A part of the data pulse signal is fed through CRC checker 210 to be supplied to a terminal 220 where it is used to determine the presence of any error during the normal use of the floppy disc drive unit.

In accordance with the invention, an automatic track misalignment adjusting command signal (hereafter simply referred to as a command signal) is applied to a terminal 230 and thence to the head fine adjustment drive 8. As mentioned previously, this command signal is produced (1) when the floppy disc drive unit is turned on, (2) when a floppy disc is changed, and (3) when a satisfactory reading of information from one of the data fields failed to occur, which is determined in accordance with an output from the terminal 220. When the command signal is produced, the read/write head 50 is accessed to a predetermined track on the disc and stopped at its initial position, in a similar manner as in a usual reading operation. Upon completion of the accessing operation, an access complete signal activates the head fine adjustment drive. It is assumed that the head fine adjustment drive 80 is designed to move the coil 40 of the read/write head H in the sequence of the position (II)→(I)→(III) as mentioned previously. When the head 50 is located at the position (II), a gate 240 completes a circuit connection with a second memory 250, and simultaneously, information from the ID field is read. The data pulse signal read is fed through the CRC checker 210 which supplies its decision (either O or X) which is stored in the second memory 250. By repeating a similar process, data are also stored in a first and a third memory 260, 270. After such data have been stored in these memories, an encoder 280 operates as decision means to determine an optimum head position by examining a data pattern stored in the memories 250, 260, 270 in accordance with a predetermined criterion. It then outputs a final positioning signal which is supplied to the head fine adjustment drive 80. While the encoder is used as decision means, it will be appreciated that a microcomputer may be used instead of it in a floppy disc drive unit of the type in which a microcomputer performs the overall control. The drive 80 responds to the final positioning signal to locate the read/write head H at the optimum position which is selected from the positions (I), (II) and (III), thus completing the correction of a track misalignment.

Where the read/write head H undergoes a continuous movement within a limited extent, the value of an output read out in the course of such movement is stored in a manner corresponding to the head position where the output is read, for example, by plotting an output on the ordinate against the head position taken on the abscissa, and the head is finally moved to a position which corresponds to the maximum output among the stored values, thus completing the correction of a track misalignment.

When the invention is carried out when reading information from the floppy disc, the output as well as the accuracy of information read can be substantially improved. If the invention is carried out when writing information onto the floppy disc, the information can be recorded on the ID field at a proper position which is aligned with the ideal centerline. In addition, a margin for information entry and playback can be improved.

2. Apparatus for correcting a track misalignment of floppy disc

Figure 14:
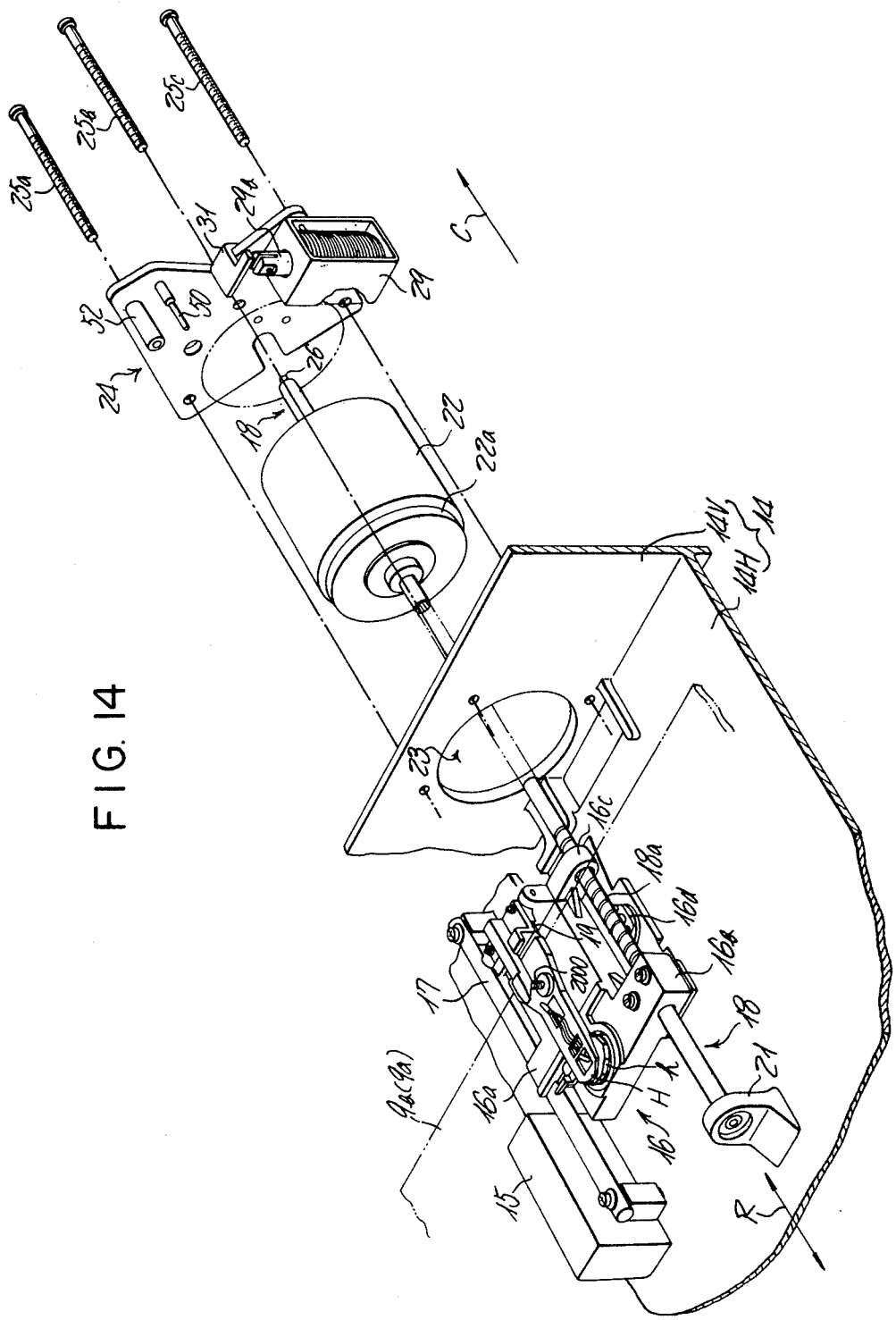
FIG. 14 is an exploded perspective view of parts located adjacent a read/write head, illustrating one embodiment of the invention.

Referring to FIG. 14, there is shown a floppy disc drive unit including a framework 14 on which various members are assembled. The framework 14 includes a horizontal portion 14H, above which a rectangular mount 15 projects for supporting a floppy disc 9a together with another mount which is not shown. A head body 16 has a read/write head H mounted thereon and includes an arm 16a which projects from one lateral side thereof and which is in slidable engagement with a guide shaft 17 disposed on the horizontal portion 14H and extending parallel to the radial direction R. The opposite lateral side of the head body is formed with a pair of spaced ears 16b, 16c through which a feed screw 18 slidably extends. The feed screw 18 extends in parallel relationship with the guide shaft 17 and includes a threaded portion 18a which is threadably engaged by a female member 16d, which is also part of the head body. As a result of such arrangement, the head body 16 is fed in the axial direction of the feed screw 18 or in the radial direction R of the floppy disc as the screw 18 rotates.

The read/write head H has its one end secured to the head body 16 through a resilient plate 19 and is normally urged by a coiled compression spring 200 to move counterclockwise about the resilient plate 19. The resulting angular movement of the read/write head H is blocked by the abutment of the head H against another read/write head h or the surface of the floppy disc 9a. The head H may abut against another read/write head h when the floppy disc 9a is not mounted. Whenever the floppy disc 9a is mounted, the head H abuts against the surface thereof. Both of the heads H, h have the same function, and if the head H reads or writes information from or onto a first surface of the floppy disc 9a, the other head h reads or writes information from or onto the second surface of the disc 9a. The read/write head H is raised in interlocked relationship with the lid 11 (FIG. 2) before the floppy disc 9a moves into its loaded position as guided by the mount 15. In the loaded position, the floppy disc 9a is held sandwiched between both of the heads H, h in the region of the opening or slot 13 (FIG. 2), whereby the entry and/or playback of information is enabled.

One end of the feed screw 18 is supported by a bracket 21 so as to be axially slidable while the other end is integrally connected with the rotary shaft of the pulse motor M, the rotary shaft also projecting to the opposite side thereof. The pulse motor 22 is formed with a relieved portion 22a, which is fitted into an opening 23 formed in the vertical portion 14V of the framework 14 and is secured thereto by means of three set screws 25a, 25b, 25c, thus holding the motor between the vertical portion 14H and a mounting plate 24.

Figure 15:
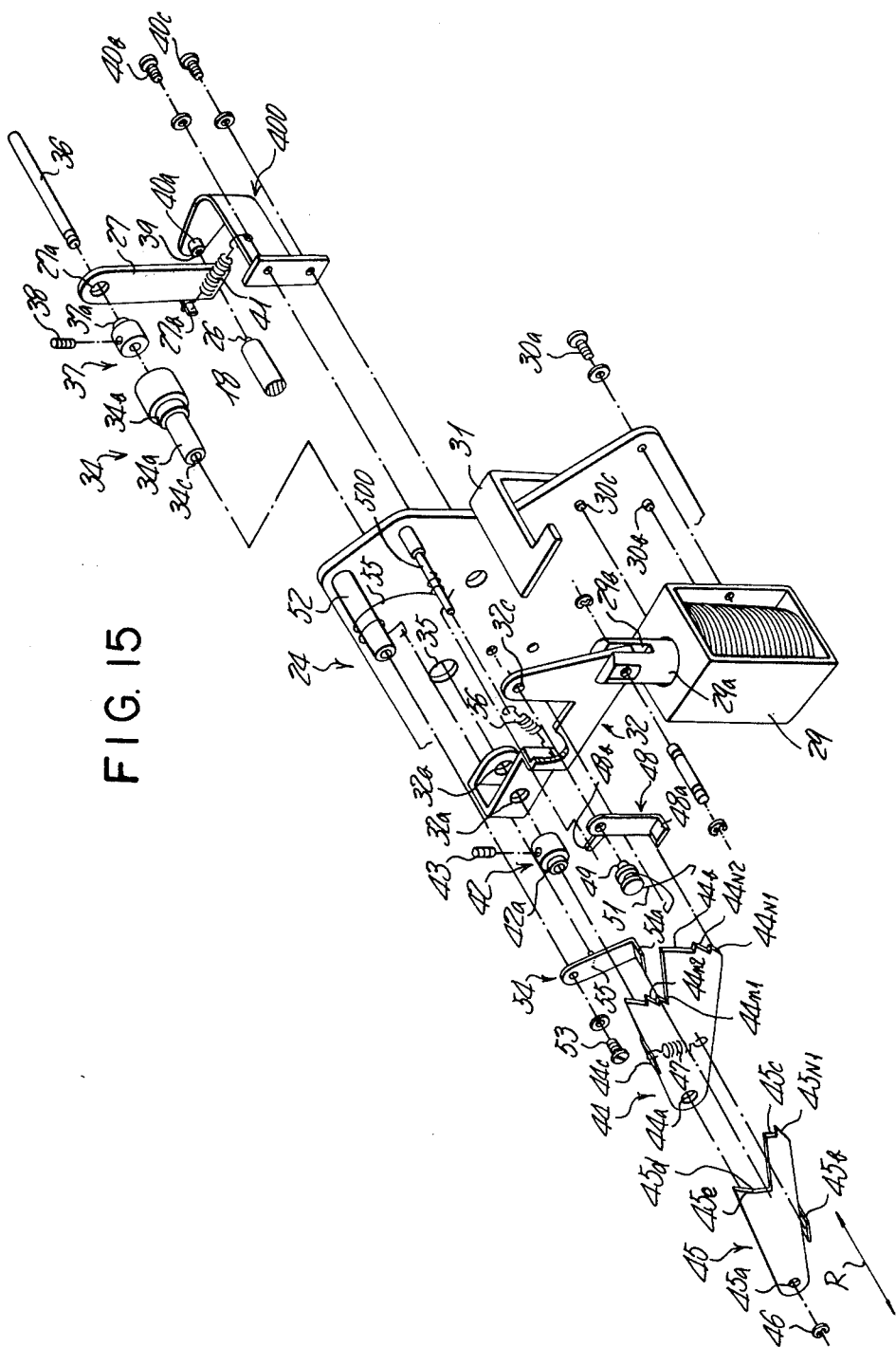
FIG. 15 is an exploded perspective view of essential parts of a fine positioning apparatus for a read/write head associated with a floppy disc.
Figure 16:
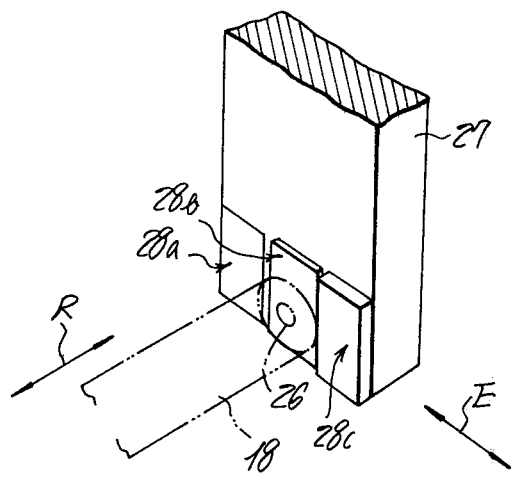
FIG. 16 is a fragmentary perspective view of a cam.

The feed screw 18 is disposed to be axially slidable through the pulse motor 22 by a stroke, for example, 200 microns, which is greater than the magnitude of a desired incremental movement of the read/write head H (hereafter inclusive of read/write head h), which may be equal to, for example, ±50 microns=100 microns, and is also resiliently biased in a given axial direction, for example, in a direction indicated by an arrow C, by a spring mechanism which is known in itself. A ball 26 is embedded in the opposite end of the rotary shaft and is resiliently urged into abutment against the surface of a stepped cam 27 (FIG. 15) having different elevations. As shown in FIG. 16, by moving the cam 27 in a direction indicated by an arrow E, the ball 26 may be brought into abutment against successive stepped surfaces 28a, 28b, 28c of the cam, thereby allowing the entire feed screw 18 to be fed in the radial direction R by an amount corresponding to the difference in the elevation between the successive stepped surfaces. Such movement is effective to achieve a fine adjustment of position of the read/write head H.

A mechanism which moves the cam 27 stepwise to bring the stepped surfaces 28a, 28b, 28c sequentially into abutment against the ball 26 is assembled on the mounting plate 24. However, this mechanism is not shown in FIG. 14 in order to avoid a complication of illustration. Referring to FIG. 15, a arrangement for achieving a fine adjustment of the position of the read/write head will be described. A solenoid 29 is mounted on the left-hand side of the mounting plate 24 by set screws 30a, 30b, 30c. The screws 30b, 30c are also used to mount L-shaped stop 31 fixedly on the mounting plate 24. The stop 31 is effective to constrain the upper limit of movement of a plunger 29a associated with the solenoid 29. The top end of the plunger 29a is axially formed with a groove 29b in which one end of a drive lever 32 is fitted and is pivotally mounted in the plunger 29a by means of a pivot pin 33. The other end of the drive lever 32 is folded into a channel configuration, in both limbs of which are formed openings 32a, 32b through which a sleeve portion 34a of a hollow shaft 34 rotatably extends. The hollow shaft 34 is formed with a relieved portion 34b which is fitted into and caulked to an opening 35 formed in the mounting plate 24. In this manner, the hollow shaft 34 is integrally mounted on the mounting plate 24.

The hollow shaft 34 has a bore 34c through which a drive shaft 36 extends in a rotatable manner. The drive shaft 36 extends through a sleeve 37 which is locked against rotation relative to the drive shaft 36 by a screw 38. The sleeve 37 is externally formed with a relieved portion 37a, which is fitted into and caulked to an opening 27a formed in one end of the cam 27, whereby the cam 27, sleeve 37 and drive shaft 36 are connected together substantially in an integral manner.

As shown in exaggerated form in FIG. 16, the opposite end of the cam 27 is formed with three stepped surfaces 28a, 28b, 28c having an increasing elevation in the sequence named, on its inside. The ball 26 embedded in the adjacent end of the feed screw 28 is resiliently urged into abutment against any one of these stepped surfaces. To prevent a flexure of the cam 27 under such resilient bias, a loading ball 39 contacts the opposite side of the cam 27 from the ball 26 and is embedded in a pedestal 40a which is fixedly mounted on an angle member 400, that is in turn fixedly mounted on the outside of the mounting plate 24 by set screws 40b, 40c. Adjacent its free end, the cam 27 is formed with a folded piece 27b, which is engaged by one end of a tension spring 41, the other end of which is anchored to the end of the angle member 400 remote from the pedestal 40a, thus normally urging the cam 27 to rotate counterclockwise.

A sleeve 42 is passed over the drive shaft 36 on the left-hand side of the opening 32a, and is integrally connected to the drive shaft 36 by a set screw 43. The sleeve 42 is formed with a relieved portion 42a, which is fitted into and caulked to an opening 44 formed in the base end of a drive pawl lever 44. Consequently, the drive pawl lever 44 is substantially integral with the drive shaft 36. A release pawl lever 45 is located adjacent the drive pawl lever 44 on the left-hand side thereof, and has an opening 45a formed in its base end through which the drive shaft 36 extends. The free end of the drive shaft 36 projects through the release pawl lever to the left-hand side thereof and fixedly carries a C-ring 46, which locks the release pawl lever 45 against disengagement from the drive shaft 36.

Continuing the description of the drive pawl lever 44, it is formed with a pair of feed pawls $44N_1$, $44N_2$ located on an arc struck from the center of the opening 44a. It is also formed with an arcuate segment 44b which is contiguous with the feed pawl $44N_2$, but which is suddenly interrupted, terminating in a generally radially extending edge which is then followed by a pair of position holding pawls $44n_1$, $44n_2$ located on an arc struck from the center of the opening 44a and having a smaller radius than the first mentioned arc. Along its upper edge, the drive pawl lever 44 is formed with a folded piece 44c, which is raised therefrom and which is engaged by one end of a tension spring 47, the other end of which is anchored to a tab 45b which is raised from the lower edge of the release pawl lever 45. The spring 47 normally urges the pawl levers 44, 45 in a manner such that the release pawl lever 45 rotates counterclockwise about the center of the opening 45a with respect to the drive pawl lever 44.

Continuing the description of the release pawl lever 45, it is formed with a single feed pawl $45N_1$ located on an arc struck from the center of the opening 45a and having a greater radius than the radius of the arc on which the feed pawls $44N_1$, $44N_2$ are located. The feed pawl $45N_1$ is followed by a step 45c, which is suddenly interrupted, terminating in a generally radially extending edge, which is then followed by an arcuate segment 45d located on an arc struck from the center of the opening 45a and having a radius which is less than the radius of the arc on which the feed pawl $45N_1$ is located. The arcuate segment 45d has a length which is equal to the combined length of the position holding pawls $44n_1$, $44n_2$, and is located on an arc of a radius which is less than that of the latter. The end of the arcuate segment 45d continues into a bevelled surface 45e which is formed to exhibit an increasing radius.

The end of the drive lever 32 located adjacent the solenoid 29 is formed with an upper extension in which an opening 32c is formed in a region above the pivot pin 33, and a first auxiliary lever 48 is rotatably mounted on a stud 49 which is fitted into and caulked to the opening 32c. The free end of the first auxiliary lever 48 is folded into an L-configuration, defining a pawl 48a which is adapted to engage the feed pawl $44N_1$, $44N_2$, $45N_1$ during the operation of the apparatus.

Adjacent to its end remote from the pawl 48a, a small lever 48b branches from the first auxiliary lever 48, and is adapted to engage a stud 500 fixedly mounted on the left-hand surface of the mounting plate 24 during the operation of the apparatus. The head of the stud 49 is formed with a groove in which a torsion spring 51 is disposed which has its one end engaged with the drive lever 32 and its other end anchored to the pawl 48a. The spring 51 has the tendency to have its both limbs to be closed. The spring 51 urges the first auxiliary lever 48 to rotate clockwise about the stud 49, but the resulting rotation is blocked by the abutment of the pawl 48a against either one of the slope of the feed screw $44N_2$, the arcuate segment $44b$ or the step $45a$ or the abutment of the small lever $48b$ against the stud 500.

A stud 52 is fixedly mounted on the left-hand surface of the mounting plate 24, and has a second auxiliary lever 54 pivotally mounted on its free end by utilizing a set screw 53. The free end of the second auxiliary lever 54 is folded into an L-configuration, defining a pawl $54a$ which is adapted to engage the position holding pawls $44n_1$, $44n_2$ during the operation of the apparatus. A torsion spring 55 having the tendency to have its limbs to move apart is disposed on the stud 52 and has its one end wrapped around the stud 500 and its other end engaged with a lateral side of the second auxiliary lever 54. The spring 55 urges the second auxiliary lever 54 to rotate clockwise about the screw 53, but the resulting rotation is blocked by the abutment of the pawl $54a$ against one of the position holding pawls $44n_1$, $44n_2$ and the bevelled surface $45e$.

Finally, a tension spring 56 extends across a point on the drive lever 32 adjacent the opening $32a$ and the stud 500, and urges the drive lever 32 to rotate counterclockwise about the sleeve $34a$ and also urges the plunger $29a$ associated with the solenoid 29 to move upward. However, the resulting movement is blocked by the abutment of the upper end of the plunger $29a$ against the stop 31 except when the plunger $29a$ is magnetically attracted.

Before describing the operation of the invention, it should be noted that in the present embodiment, the cam 27 and the drive pawl lever 44 are coupled together in substantially integral manner through the drive shaft 36, whereby a control of the angular movement of the drive pawl lever 44 permits the angular position of the cam 27 to be controlled.

Figure 18:
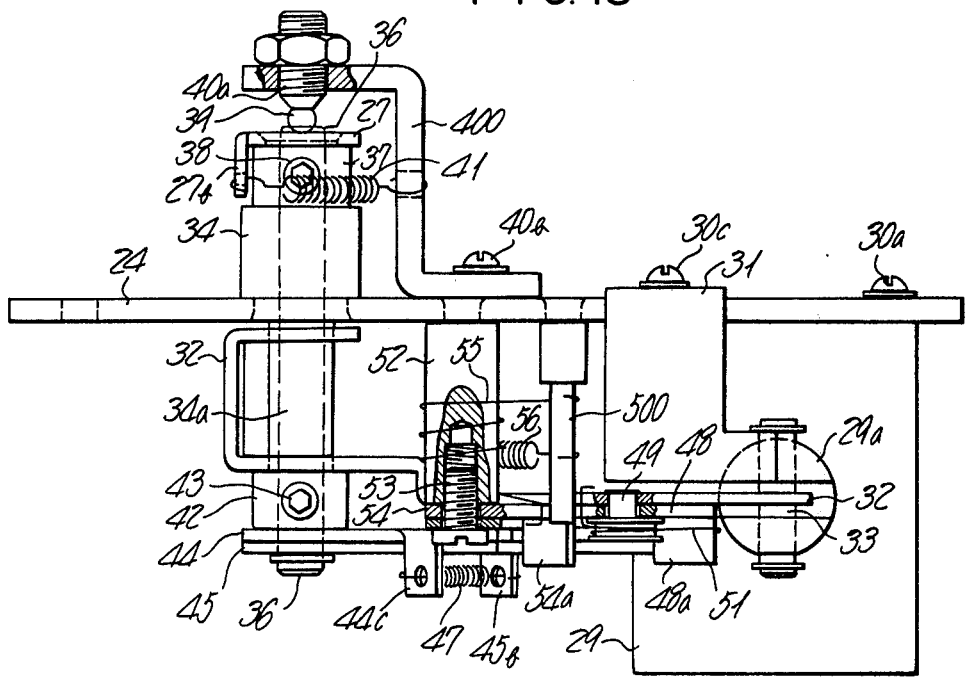
FIG. 18 is a plan view corresponding to the arrangement shown in FIG. 17.
Figure 17:
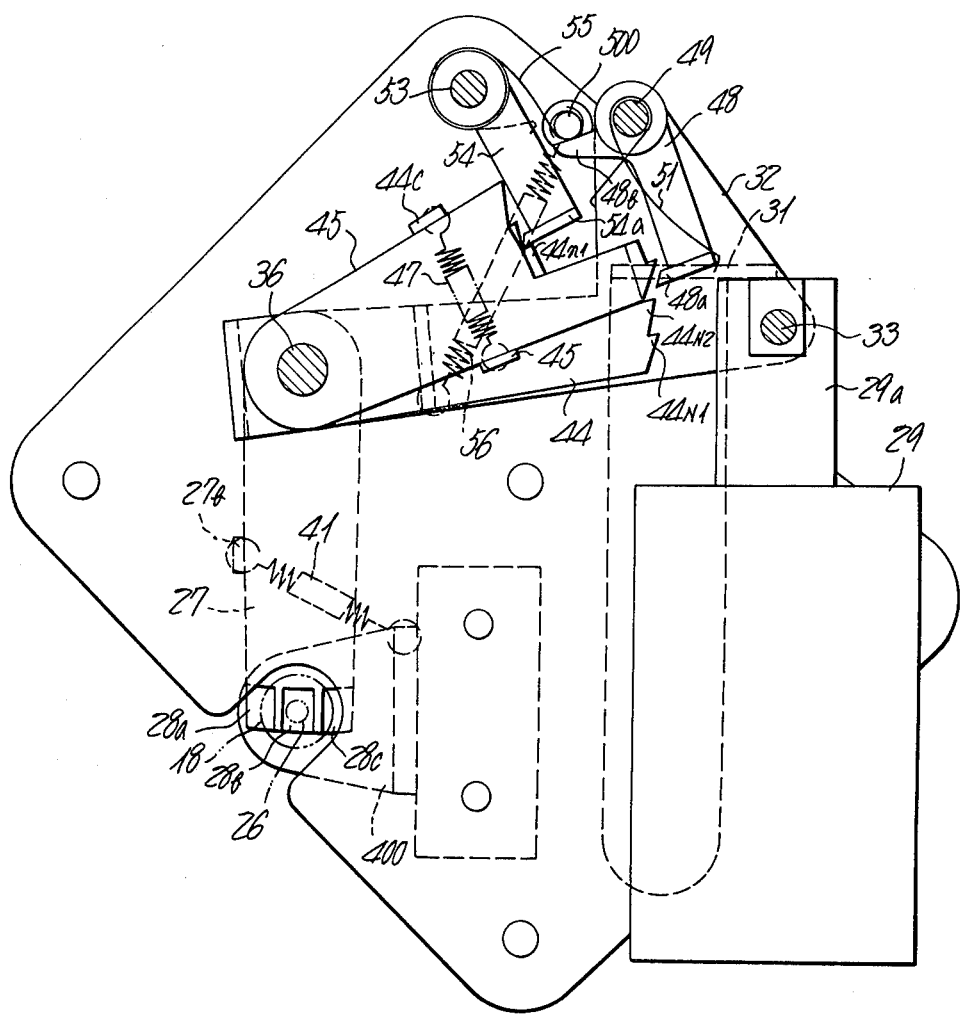
FIGS. 17 and 19 to 23 are front views of essential parts of the fine positioning apparatus at various phases of operation.

(1) Home position (FIGS. 17 and 18)

The solenoid 29 remains off, and hence the plunger $29a$ is disposed at its upper limit or in abutment against the stop 31 under the resilience of the spring 56. Since the small lever $48b$ branched from the first auxiliary lever 48 bears against the stud 500, the pawl $48a$ is free to move. The drive pawl lever 44 has its position holding pawl $44n_1$ engaged with the pawl $54a$ and the cam 27 is positioned in the corresponding manner to locate its stepped surface $28b$ in abutment against the ball 26 which is embedded in the end of the feed screw 18. The release pawl lever 45 has angularly moved around the drive shaft 36 under the resilience of the spring 47 until its lateral side bears against the folded piece $44c$. At this time, the release pawl lever 45 remains free with respect to either pawl $48a$ or $54a$.

Figure 19:
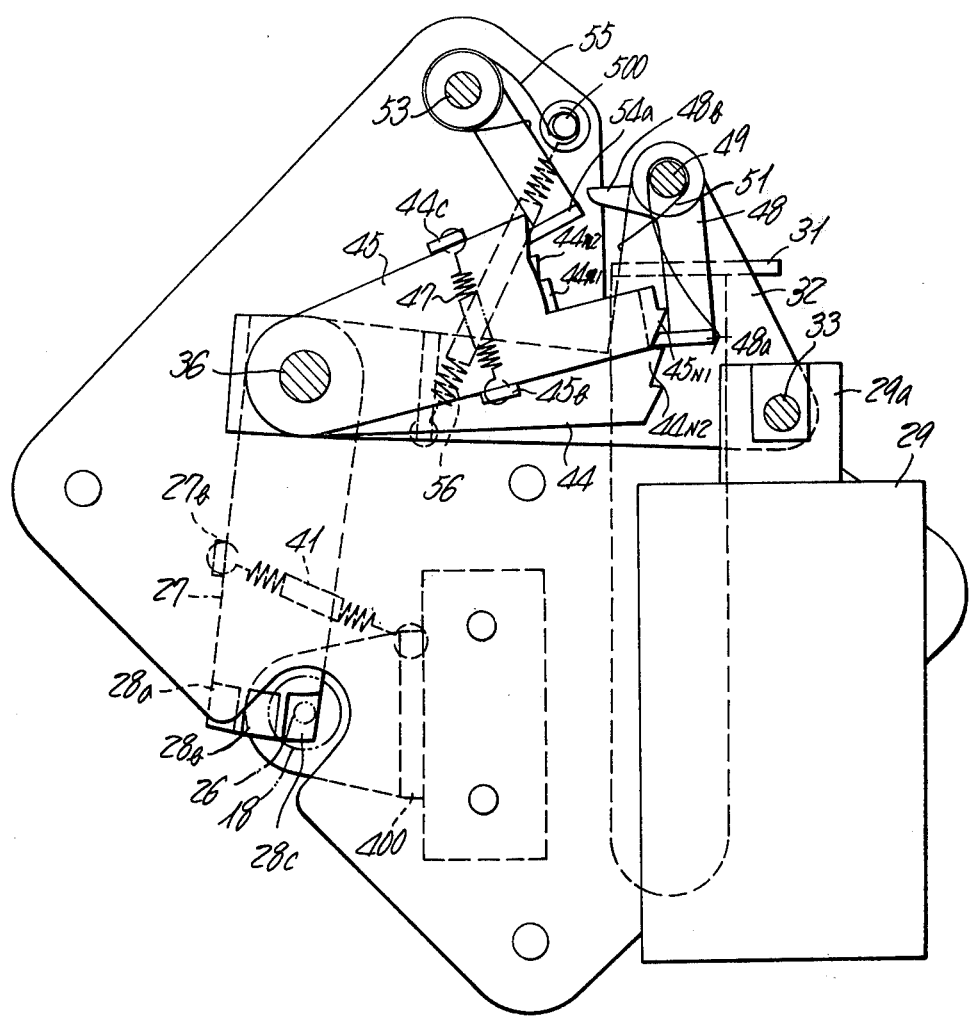

(2) Angular movement of the cam through one step (FIGS. 17 and 19)

A fine adjustment signal which commands a movement of the read/write head energizes the solenoid 29, whereupon the plunger $29a$ is attracted thereto. In interlocked relationship therewith, the cam 27 moves angularly through one step, bringing the stepped surface $28c$ for abutment against the pawl 26 on the feed screw 18 in substitution for the previous stepped surface $28b$. As mentioned previously, the stepped surface $28c$ has a higher elevation than the stepped surface $28b$ (by an amount on the order of 50 microns, for example). Consequently, during such operation, the feed screw 18 is driven an incremental distance, for example, 50 microns, to the left in the radial direction R as viewed in FIGS. 14 and 15. Obviously, the read/write head H moves by the same distance together with the feed screw 18.

Considering such process more specifically, it will be noted that as the plunger $29a$ is attracted against the resilience of the spring 56, the drive lever 32 moves clockwise about the sleeve portion $34a$ (drive shaft 36). After it has angularly moved slightly, the small lever $48b$ is disengaged from the stud 500 while the first auxiliary lever 48 rotates clockwise under the resilience of the spring 51 to bring the pawl $48a$ into engagement with the feed pawl $44N_2$. Subsequently, the drive pawl lever 44 rotates clockwise about the drive shaft 36 as the plunger $29a$ moves down, the drive shaft 36 also rotating at this time. The cam 27 which is integral with the drive shaft 36 angularly moves to stress the spring 41, changing the stepped surface against which the ball 26 abuts. During the rotation of the drive pawl lever 44, the folded piece $44c$ bears against the side of the release pawl lever 45 to drive it, whereby the release pawl lever 45 also rotates about the drive shaft 36 in integral manner with the drive pawl lever 44. Before the plunger 29 reaches its lower limit, the pawl $54a$ moves past the position holding pawl $44n_2$ as the drive pawl lever 44 rotates. When the plunger $29a$ reaches its lower limit, the pawl $54a$ bears against the bevelled surface $45e$ under the resilience of the spring 55 and remains stationary. It will be noted that FIG. 17 shows the position of various parts at the beginning of such process and FIG. 19 illustrates the position of various parts at the end of such process.

Figure 20:
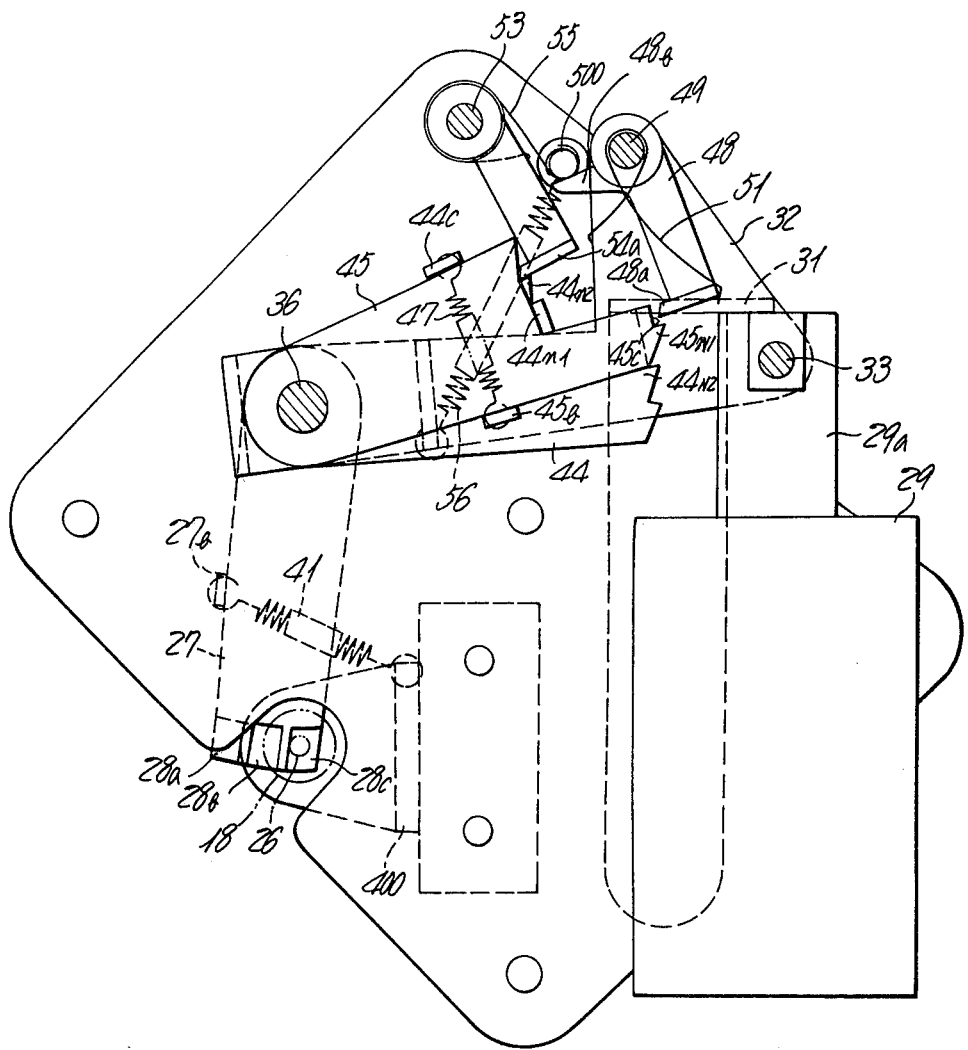

(3) Cam position holding process (FIGS. 19 and 20)

It is to be noted that a fine adjustment signal is applied only momentarily, so that after the plunger $29a$ has moved down to its lower limit, it is immediately returned or driven upwardly under the resilience of the springs 56 and 41, together with the drive lever 32 which then rotates counterclockwise. In the course of such movement, the position of the cam 27 is maintained and the preparation for the next succeeding process is made, as will be more specifically described below. As the drive lever 32 rotates, the first auxiliary lever 48 moves in integral manner therewith. On the other hand, since the feed pawl $44N_2$ is maintained in engagement with the pawl $48a$ under the resilience of the spring 41, the movement of the pawl 48 causes both the drive pawl lever 44 and the release pawl lever 45 to rotate, leaving the feed pawl $44N_2$ and the pawl $48a$ in engaged position (FIG. 19).

The release pawl lever 45 bears against the folded piece $44c$ under the resilience of the spring 47 so that drive pawl lever 44 and the release pawl lever 45 rotate integrally, and the drive pawl lever 44 and the release pawl lever 45 are maintained in their positions where the pawl $54a$ engages the position holding pawl $44n_2$, against the resilience of the spring 41. Under this condition, the stepped surface $28c$ is properly located in opposing relationship with the ball 26, which is therefore disposed in abutment against it, thus maintaining the angular position of the cam 27. As the plunger $29a$ continues to move upward, the drive lever 32 responds thereto by continuing a counterclockwise rotation about the drive shaft 36. In response thereto, the pawl $48a$ moves past the feed pawl $45N_1$ and when the small lever $48b$ is engaged by the stud 500 and the pawl 48 is located opposite to the step $45c$, the plunger $29a$ reaches its upper limit, thus terminating this process. FIG. 19 shows the position of various parts at the beginning of the process while FIG. 20 shows the position of various parts at the end of this process.

Figure 21:
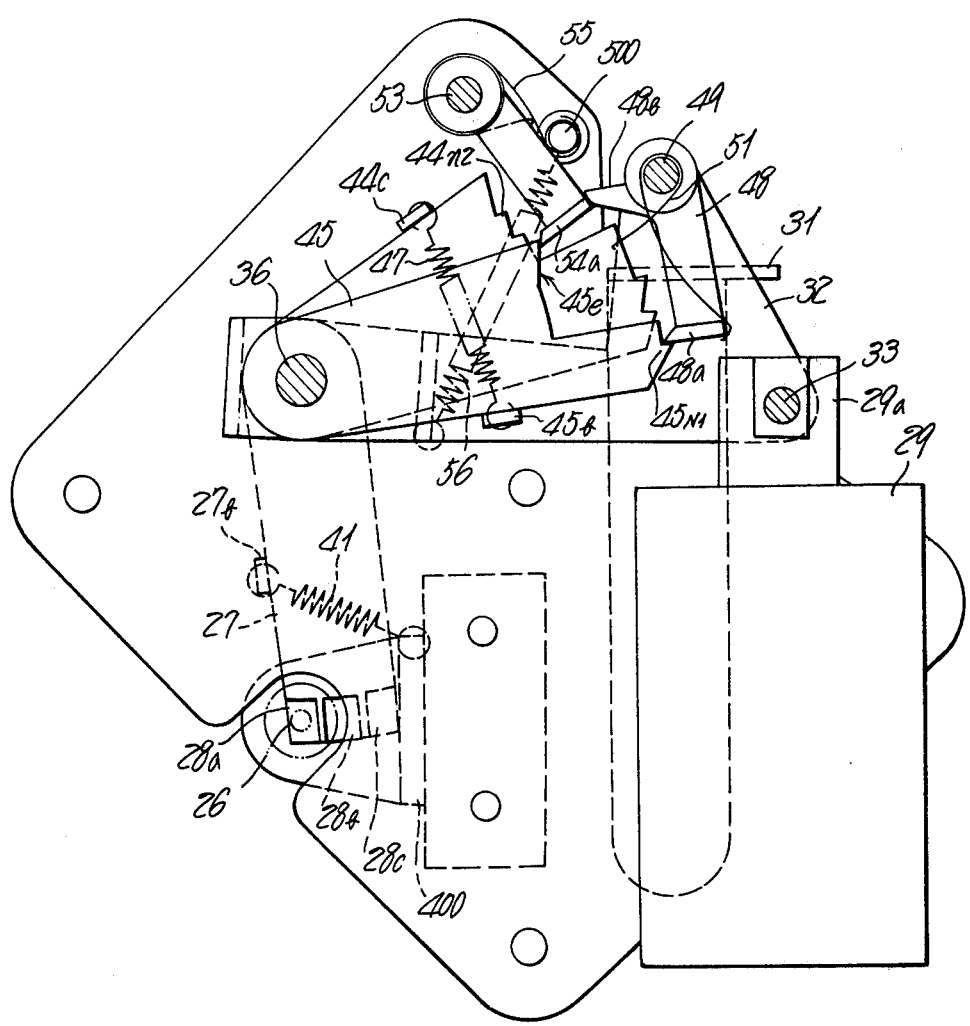

(4) Angular movement of the cam through one step (FIGS. 20 and 21)

As the fine adjustment signal is applied, the solenoid 29 is energized to attract the plunger 29a. In response thereto, the cam 27 is driven to move angularly through one step, whereby the ball 26 on the feed screw 28 abuts against the stepped surface 28a in substitution for the previous stepped surface 28c. As mentioned previously, the stepped surface 28a has a minimum elevation among the three stepped surfaces 28a to 28c. (For example, it may have an elevation which is by 50 microns lower than the stepped surface 28b and by 100 microns lower than the stepped surface 28c.) Hence, the feed screw 18 moves through an incremental distance on the order of 100 microns, for example, to the right in the radial direction R shown in FIGS. 14 and 15 during the present process. The read/write head H also moves through the same distance together with the feed screw 18.

Considering the operation which takes place during the present process more specifically, the drive lever 32 initially moves clockwise about the sleeve portion 34a or the drive shaft 36 as the plunger 29a is attracted against the resilience of the spring 56. After a slight rotation of the drive lever, the small lever 48b is disengaged from the stud 500, whereby the resilience of the spring 51 causes the first auxiliary lever 48 to rotate clockwise, thus bringing the pawl 48a into engagement with the feed pawl 45$N_1$. Hence, the release pawl lever 45 rotates clockwise about the drive shaft 36 as the plunger 29a moves down. As the release lever 45 rotates, the bevelled surface 45e gradually raises the pawl 54a until the latter is disengaged from the position holding pawl 44$n_2$. Concurrently with this disengagement, the resilience of the spring 41 causes the cam 27 to move, in one step, to a position where the stepped surface 28a is presented for abutment by the ball 26 against the resilience of the spring 47. Exactly when the cam 27 reaches such position, its rotation is stopped by the abutment of the lateral side of the cam 27 against the angle member 400. At this time, the pawl 54a is located just short of engagement with the position holding pawl 44$n_1$. Thus, the positioning of the stepped surface 28a relative to the ball 26 is completed, and the read/write head H has been subjected to an incremental movement.

Because the release pawl lever 45 has its feed pawl 45$N_1$ locked by the pawl 48a, it rotates clockwise as the plunger 29a moves down until the latter reaches its lower limit while stressing the spring 47 and 56. Since the resilience of the spring 47 is designed to be stronger than that of the spring 41, it is avoided that the drive pawl lever 44 (cam 27) rotates clockwise under the resilience of the spring 47. The process is terminated when the plunger 29a reaches its lower limit. FIG. 20 illustrates the position of various parts at the beginning of the process while FIG. 21 illustrates the position of corresponding parts at the end of the process.

Figure 22:
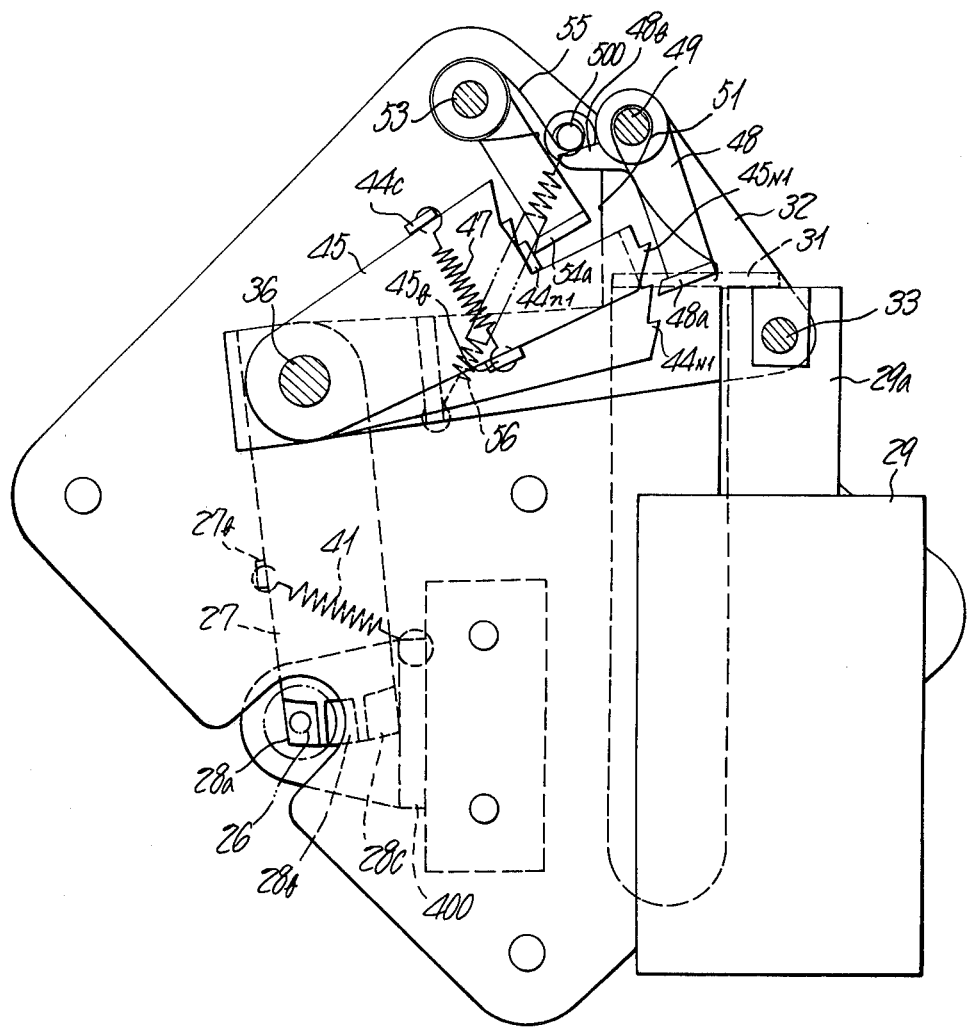

(5) Intermediate step (see FIGS. 21 and 22)

As mentioned previously, the fine adjustment signal is applied only momentarily, so that after the plunger 29a has been depressed to its lower limit, it is immediately returned under the resilience of the springs 47 and 56 together with the drive lever 32 which then rotates counterclockwise. In the course of such operation, a preparation for the next succeeding process is made. Specifically, as the drive lever 32 rotates, the first auxiliary lever 48 rotates integrally therewith. On the other hand, the feed pawl 45$N_1$ is urged by the spring 47 into engagement with the pawl 48a, and remains engaged therewith if the latter moves as the drive lever 32 rotates. However, as the plunger 29a approaches its lower limit, the small lever 48b becomes engaged with with the stud 500, whereby it is forced to rotate counterclockwise about the pin 49 against the tendency of the spring 51 to close its limb until the pawl 48a is eventually disengaged from the feed pawl 45$N_1$. The release pawl lever 45 then is urged by the spring 47 to rotate to a position where its lateral side bears against the folded piece 44c and where it comes to a stop. The process is then terminated with the plunger 29a reaching its upper limit, the pawl 48a being located just short of engagement with the feed pawl 44$N_1$ and the pawl 54a being just short of engagement with the position holding pawl 44$n_1$. The position of various parts at the beginning and at the end of this process is illustrated in FIGS. 21 and 22, respectively.

Figure 23:
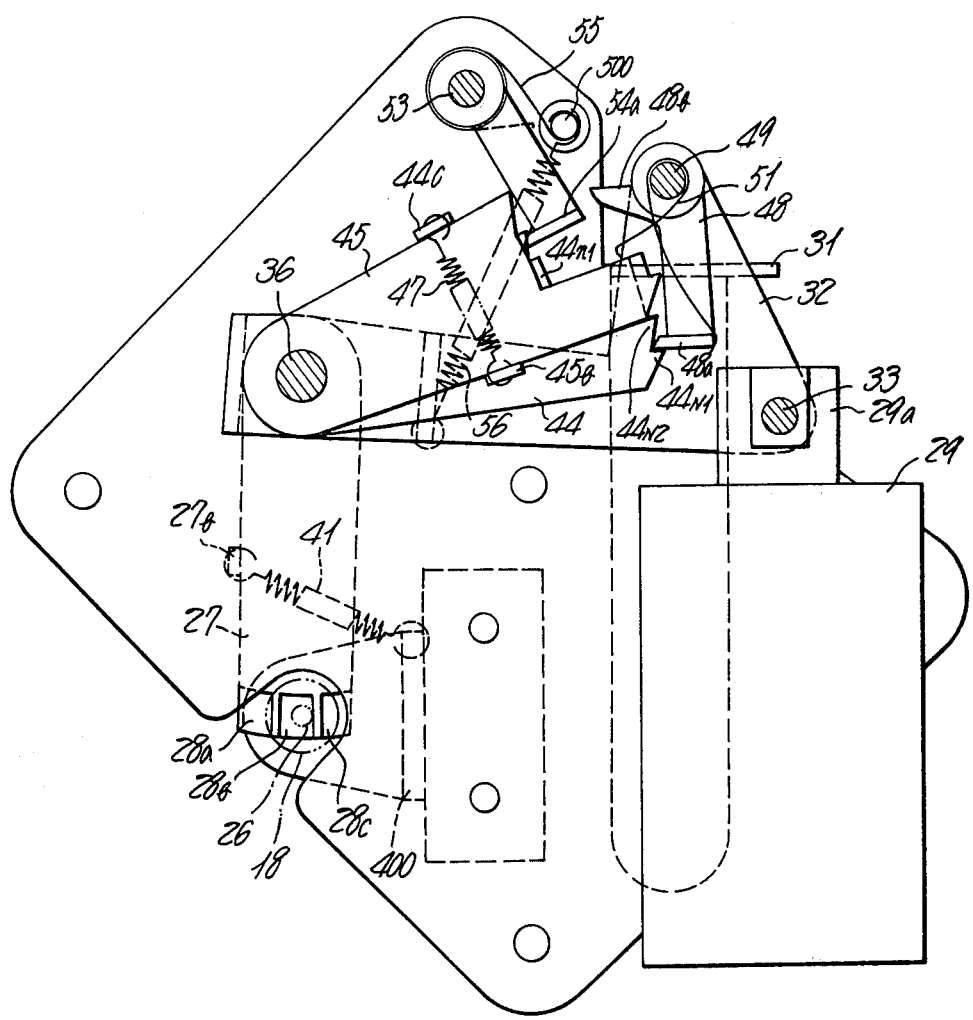
Figure 24:
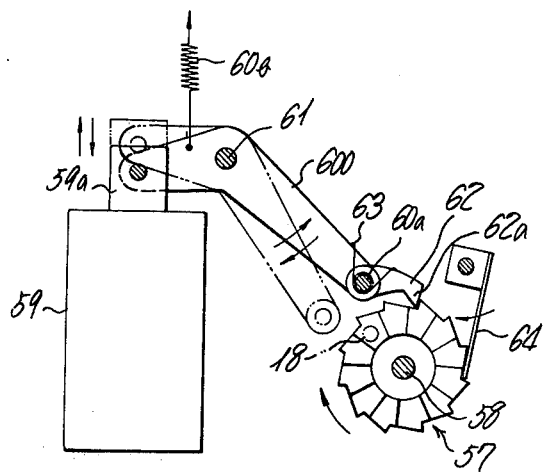
FIG. 24 is a front view of another embodiment of the invention.
Figure 25:
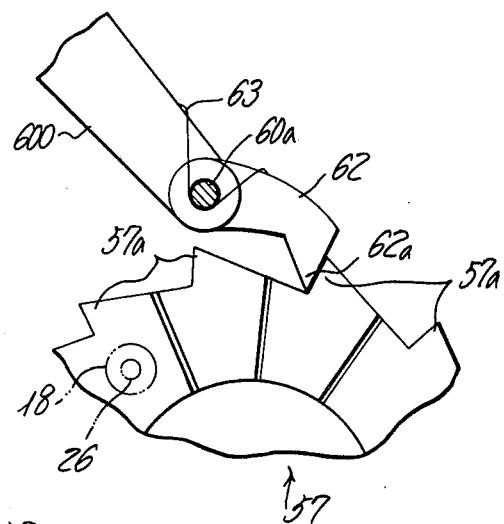
FIG. 25 is an enlarged front view of a pawl lever shown in FIG. 24.
Figure 26:
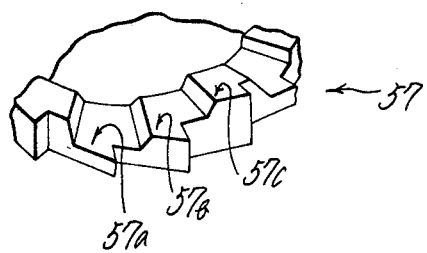
FIG. 26 is a fragmentary perspective view of the cam.
Figure 27:
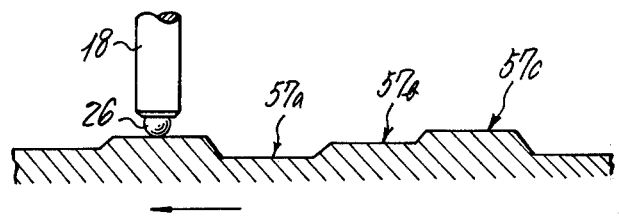
FIG. 27 is a developed cross section of the cam shown in FIGS. 24 to 26.

(6) Angular movement of the cam through one step (see FIGS. 22 and 23)

As the fine adjustment signal is applied, the solenoid 29 is energized to attract the plunger 29a. In response thereto, the cam 27 moves angularly through one step, bringing the stepped surface 28b for abutment against the ball 26 in substitution to the previous stepped surface 28a, thus returning to the home position. During this process, the feed screw 18 is moved incrementally, for example, through a distance of 50 microns, for example, to the left in the radial direction R shown in FIGS. 14 and 15. Obviously, the read/write head H is moved by the same distance together with the feed screw 18.

Specifically, as the plunger 29a is attracted against the resilience of the spring 56, the drive lever 32 rotates clockwise about the sleeve portion 34a or the drive shaft 36. After slight rotation of the drive lever, the small lever 48b is disengaged from the stud 500, whereby the first auxiliary lever 48 is urged by the spring 51 to rotate clockwise bringing the pawl 48a into engagement with the feed pawl 44$N_1$. Consequently, the drive pawl lever 44 rotates about the drive shaft 36 in integral manner with the release pawl lever 45 as the plunger 29a moves down. As the drive pawl lever 44 rotates, the position holding pawl 44$n_1$ moves relative to the pawl 54a, and the process is terminated when the pawl 54a moves into the valley of the position holding pawl 44$n_1$. By this time, the cam 27 which is substantially integral with the drive pawl lever 44 has moved angularly through one step, thus bringing the stepped surface 48b for abutment against the ball 26 substitution for the previous stepped surface 28a. The position of various parts at the beginning and at the end of this process is illustrated in FIGS. 22 and 23, respectively.

(7) Cam position holding process (see FIGS. 17 and 23)

As mentioned previously, the momentary application of the fine adjustment signal causes the plunger 29a to be returned upwardly under the resilience of the spring 56 together with the drive lever 32 which rotates counterclockwise, after the plunger has been moved to its lower limit. In the course of such movement, the position of the cam 27 is maintained and preparation for the next succeeding process is made. Specifically, as the drive lever 32 rotates, the first auxiliary lever 48 moves integrally therewith. Since the release pawl lever 45 is urged by the spring 47 into abutment against the folded piece 44c, it moves integrally with the drive pawl lever 44 as the drive lever 32 rotates.

On the other hand, the feed pawl 44N₁ is urged by the spring 41 into engagement with the pawl 48a and this engagement is maintained if the pawl 48 moves because both the drive pawl lever 44 and the release pawl lever 45 rotate in a manner to follow the movement of the pawl 48a (FIG. 23). However, after a slight movement of the drive lever 44, the pawl 54a becomes engaged with the position holding pawl 44n₁ to prevent a further rotation of the lever 44. Consequently, in this position of the cam 27, the stepped surface 28b is properly located for abutment by the ball 26. After a further rotation of the drive pawl lever 44 is prevented, the pawl 48a becomes free at a location where it has moved past the feed pawl 44N₂ as the plunger 29a moves upward and where the small lever 48b is engaged by the stud 500. At this time, the plunger 29a reaches its upper limit, completing the operation. The position of various parts at the beginning and at the end of this process is illustrated in FIGS. 23 and 17, respectively.

As discussed above, in the present embodiment, the angular position of the cam 27 is determined in interlocked relationship with the vertical movement of the plunger 29a, thereby changing the stepped surface of the cam 27 which is disposed for abutment by the ball 26, thus enabling an incremental movement of the position of the read/write head H. Through the fine adjustment mentioned above, a location can be detected where the read/write head H provides a maximum output, and the head is accordingly located for playback. Also, the read/write head H can be properly located over a desired track for entering information thereon.

FIGS. 24 to 27 show another embodiment of the invention. In this embodiment, the cam 27 described above is replaced by a ratchet wheel 57 which is peripherally formed with stepped surfaces. A shaft 58 integral with a stationary member extends through the center of a cam 57 for rotatably carrying it. There is shown a solenoid 59 associated with a plunger 59a on which one end of a chevron-shaped arm 600 is pivotally mounted. A tension spring 60b is connected to the arm 60 adjacent this end, and urges the arm 600 to rotate clockwise about a pivot pin 61. However, the resulting movement is constrained by the stroke of the plunger 59a. Intermediate its length, the arm 600 is pivotally mounted on the pin 61 which is integral with a stationary member. The other end of the arm 600 pivotally carries a pawl lever 62 which is mounted thereon by means of a pin 60a. The pawl lever 62 carries a pawl 62a which is diposed for engagement with one of the pawls 57a on the cam 57. A spring 63 having the tendency to have its limbs spaced apart is disposed on the pin 60a, and have its both limbs engaged with the side of the arm 600 and the pawl lever 62, respectively. Consequently, the pawl lever 62 is urged to rotate clockwise about the pin 60a, but the resulting rotation is blocked by the abutment of the pawl 62a against one of the pawls 57a. A leaf spring 64 is disposed for resilient abutment against one of the pawls 57a normally. On its one side, one of the major surfaces of the cam 57 is divided into equal segments in alignment with the individual pawls 57a, and having different surface levels. Taking one of the surfaces 57b, as a reference, a stepped surface 57a located on the left-hand side of the reference surface has a lower elevation, for example, by a height of 50 microns, than the surface 57b while a stepped surface 57c located on the right-hand side of the surface 57b has a higher elevation, for example, of 50 microns, than the surface 57b. In this manner, the lateral side of the cam 57 is sequentially formed with stepped surfaces having an increasing elevation in a cyclic manner. A ball 26 embedded in the end of the feed screw 18 is disposed for abutment against this lateral side of the cam.

When a fine adjustment signal is applied to the solenoid 59, the plunger 59a is attracted thereby against the resilience of the spring 60b. Consequently, the arm 600 rotates clockwise, allowing the ratchet wheel or the cam 57 to be incrementally rotated through one pitch of the pawls 57a (see phantom line illustration in FIG. 24). When the plunger 59a is released from the attraction, the spring 60b returns the plunger 59a upward while simultaneously rotating the arm 600 counterclockwise. The pawl 62a then engages another one of the pawls 57a to drive it, thus rotating the cam 57 clockwise. The angle through which the cam 57 rotates is just sufficient to displace one stepped surface for abutment by the ball. In this manner, the stepped surface on the cam 57 against which the ball 26 abuts can be changed by the application of the fine adjustment signal to the solenoid. The leaf spring 64 assists in achieving a sliding movement of the pawl 62a over one of the pawls 57a to engage the next succeeding pawl 57a. Specifically, it allows a rotation of the cam 57 only in one direction while preventing its rotation in the opposite direction. Stated differently, the leaf spring 64 allows a clockwise rotation of the cam 57, thus assuring that the pawl 62 be capable of engaging the next succeeding pawl 57a. The described rotation of the cam permits a fine adjustment of the read/write head H.

In the two embodiment described above, the cam has been described as having three stepped surfaces of different elevations. However, it should be understood that the number of stepped surfaces can be changed as desired in carrying out the invention. In the first embodiment, the number of feed pawls 44N₁, 44N₂ and position holding pawls 44n₁, 44n₂ may be changed in accordance with the number of stepped surfaces formed on the cam 27 and by changing the location of the feed pawl 45N₁ and the bevelled surface 45e of the release lever 45. In the second embodiment, it is a simple matter to increase the number of stepped surfaces in one major surface of the cam 57.

While the stepped surfaces formed on the cam are staggered from each other in a stepwise manner in the embodiment shown, it should be understood that the thickness of the cam may be linearly changed in a continuous manner, thus permitting a fine adjustment of the feed screw 18 in a linear manner.

In the embodiment described above, the head body 16 is fed in accordance with the rotation of the feed screw 18, the axial end of which is normally maintained in abutment against the cam surface so that a movement of cam permits a fine adjustment of the location of the head body 16 in integral manner with the feed screw. However, an alaternative arrangement is illustrated in FIG. 28.

Figure 28:
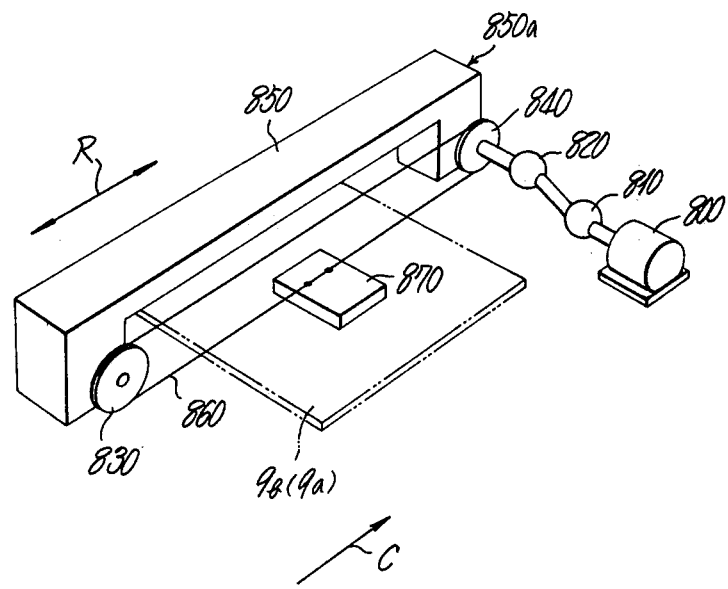
FIG. 28 is a perspective view illustrating a further embodiment of the invention.

In FIG. 28, a pulse motor 800 is connected through a pair of flexible joints 810, 820 with a pulley 840, which is rotatably mounted on one end of a frame 850. Another pulley 830 rotatably mounted on the other end of the frame 850, and a wire 860 (including a steel belt)

extends around the pair of pulleys. A head body 870 is fixedly connected with the wire 860. The pulse motor 800 is fixedly mounted on a stationary member, not shown, and its rotation may be transmitted through the flexible joints 810, 820 to rotate the pulleys 830, 840, thus causing a scanning movement of the head body 870 along a guide member, not shown, in the radial direction R of the floppy disc 9a.

The frame 850 is disposed on a guide member so as to be capable of moving through an incremental distance in the radial direction R, and is also resiliently urged in a direction indicated by an arrow C. In this arrangement, the cam of the present invention, for example, the cam 27 may be disposed in abutment against the right-hand end face 850a of the frame 850, whereby a movement of the cam 27 permits a fine adjustment of the location of the head body 870 together with the pulleys 830, 840 and the wire 860. The purpose of the flexible joints 810, 820 is to assure a smooth transmission of the rotation of the pulse motor 800 during the fine adjustment.

From the foregoing description, it will be appreciated that the invention is effectively employed in reading information from the floppy disc. It is also effective when writing information onto the floppy disc. If the accuracy with which the read/write head is positioned is poor, information may be recorded at a wrong position which is offset from a correct position during the writing operation. This aggravates a subsequent information reading from the floppy disc. However, a fine adjustment of the location of the read/write head during the write operation permits the information to be recorded at a proper location on the track.

What is claimed is:

1. For use with a floppy disc drive unit including support means for rotatably supporting a floppy disc, a read/write head for writing information onto or reading information from a track formed on the surface of a floppy disc as the latter rotates, and head feed means for moving the read/write head in a direction transverse to the track and for stopping it at a location over a desired track;

an apparatus for correcting a track misalignment of a floppy disc comprising:
a plurality of memory means each to store data information read from a data track by said head;
comparison and retrieval means to determine the optimum head position based upon the stored data information retrieved from said memory means;
a rectangular plate-shaped cam having a cam surface which either directly or indirectly acts on the read/write head to drive it, the cam having its one end pivotally mounted, and
angular drive means controlled by said comparison and retrievel means for angularly driving the cam, the angular drive means including an intermittent feed mechanism which causes the cam to move incrementally through a given angle, and a return mechanism for returning the cam to its home position in one step after the cam has been driven through a selected angle by the intermittent feed mechanism,
the intermittent feed mechanism comprising a drive lever having its one end pivotally mounted on a plunger associated with a solenoid and having its other part pivotally mounted on the drive lever, a pawl member having its own pawl adapted to engage the feed pawl and connected to the cam, and detent means having a detent pawl adapted to engage the pawl of the pawl member,
the return mechanism including bias means for normally urging the cam to move in a direction opposite from the direction in which it is incrementally driven by the intermittent feed mechanism, and release means for releasing the engagement of the pawl member by the detent means of the intermittent feed mechanism in timed relationship with a retracting and returning movement of the plunger in response to a given number of steps through which the cam has been driven.

2. For use with a floppy disc drive unit including support means for rotatably supporting a floppy disc, a read/write head for writing information onto and reading information from a track formed on the surface of a floppy disc as the latter rotates, and head feed means for moving the read/write head in a direction transverse to the track and for stopping it at a location over a desired track; an apparatus for correcting a track misalignment of a floppy disc comprising
a plurality of memory means each to store data information read from a data track by said head;
comparison and retrieval means to determine the optimum head position based upon the stored data information retrieved from said memory means;
a disc-shaped cam having a cam surface which acts on the read/write head to move it, the cam having its central portion pivotally mounted, and
an intermittent feed mechanism controlled by said comparison and retrieval means for causing an incremental movement of the cam through a given angle,
the intermittent feed mechanism comprising a drive lever having its one end pivotally mounted on a plunger associated with a solenoid and having its another part pivotally mounted on a stationary member, a feed pawl pivotally mounted on the drive lever, a pawl member having its own pawl adapted to engage the feed pawl and connected to the cam, and detent means having a detent pawl adapted to engage the pawl of the pawl member.

* * * * *